(12) United States Patent
Li et al.

(10) Patent No.: US 10,424,868 B2
(45) Date of Patent: Sep. 24, 2019

(54) ROUND CABLE

(71) Applicant: LUXSHARE PRECISION INDUSTRY Co., Ltd., Shenzhen (CN)

(72) Inventors: Hua-Bing Li, Shenzhen (CN); Hong Chi, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 0 days.

(21) Appl. No.: 16/045,095

(22) Filed: Jul. 25, 2018

(65) Prior Publication Data
US 2019/0097351 A1 Mar. 28, 2019

(30) Foreign Application Priority Data

Sep. 23, 2017 (CN) .......................... 2017 1 0869269

(51) Int. Cl.
| | | |
|---|---|---|
| *H01R 13/53* | (2006.01) | |
| *H01R 43/24* | (2006.01) | |
| *G02B 6/44* | (2006.01) | |
| *H01B 7/08* | (2006.01) | |
| *H01B 11/20* | (2006.01) | |

(52) U.S. Cl.
CPC .......... *H01R 13/53* (2013.01); *G02B 6/4433* (2013.01); *H01B 7/0892* (2013.01); *H01R 43/24* (2013.01); *H01B 11/20* (2013.01)

(58) Field of Classification Search
CPC .... H01B 7/0892; H01B 11/04; H01B 7/0853; H01B 7/0861; H01B 7/0846; H01B 7/0838
See application file for complete search history.

(56) References Cited

U.S. PATENT DOCUMENTS

| | | | | |
|---|---|---|---|---|
| 4,230,898 A * | 10/1980 | Emmel | ................ | H01B 7/0838 156/55 |
| 4,533,790 A * | 8/1985 | Johnston | ............ | H01B 11/1891 174/115 |
| 4,719,319 A * | 1/1988 | Tighe, Jr. | ............. | H01B 7/0823 174/103 |
| 4,767,891 A * | 8/1988 | Biegon | ................ | H01B 7/0846 174/112 |
| 4,847,443 A * | 7/1989 | Basconi | ............... | H01B 7/0892 174/32 |
| 4,906,067 A * | 3/1990 | Mayr | ..................... | G02B 6/441 385/112 |
| 4,915,490 A * | 4/1990 | Ramsay | ............... | G02B 6/4402 385/100 |
| 4,952,020 A * | 8/1990 | Huber | .................. | G02B 6/4403 174/117 R |

(Continued)

*Primary Examiner* — Ross N Gushi
(74) *Attorney, Agent, or Firm* — Birch, Stewart, Kolasch & Birch, LLP

(57) ABSTRACT

A round cable includes an internal cable formed by rolling a flat cable and an outer insulation jacket covering the outer side of the internal cable. The internal cable has several conductors, the internal cable includes several sector portions and a first connecting portion connecting every two adjacent sector portions, and the sector portions are stacked together one by one in a circumferential direction. The outer diameter of a round cable can be reduced, wire arrangement can be omitted before soldering, and production efficiency can be improved.

18 Claims, 5 Drawing Sheets

(56) References Cited

U.S. PATENT DOCUMENTS

| | | | | |
|---|---|---|---|---|
| 5,053,583 A * | 10/1991 | Miller | H01B 7/0892 | 174/115 |
| 5,057,646 A * | 10/1991 | Nichols | H01B 7/0823 | 174/115 |
| 5,084,594 A * | 1/1992 | Cady | H01B 7/083 | 174/36 |
| 5,097,099 A * | 3/1992 | Miller | H01B 7/0861 | 174/115 |
| 5,162,611 A * | 11/1992 | Nichols, III | H01B 7/0823 | 174/115 |
| 5,212,756 A * | 5/1993 | Eoll | G02B 6/4403 | 385/109 |
| 5,342,991 A * | 8/1994 | Xu | H01B 7/0823 | 174/115 |
| 5,428,187 A * | 6/1995 | Crane | H01B 7/0861 | 174/115 |
| 5,463,186 A * | 10/1995 | Schricker | H01B 7/0846 | 174/113 R |
| 5,499,928 A * | 3/1996 | Satoh | H01B 7/08 | 174/117 F |
| 5,649,043 A * | 7/1997 | Adams | G02B 6/4413 | 385/110 |
| 5,682,454 A * | 10/1997 | Gaillard | G02B 6/4403 | 174/117 F |
| 5,720,908 A * | 2/1998 | Gaillard | G02B 6/4403 | 174/117 F |
| 5,767,442 A * | 6/1998 | Eisenberg | H01B 7/0892 | 174/113 R |
| 5,834,698 A * | 11/1998 | Izui | H01B 7/0892 | 174/113 R |
| 6,010,788 A * | 1/2000 | Kebabjian | H01B 11/002 | 174/102 R |
| 6,111,202 A * | 8/2000 | Martin | H01B 7/40 | 174/110 R |
| 6,452,107 B1 * | 9/2002 | Kebabjian | H01B 11/002 | 174/113 R |
| 6,717,058 B2 * | 4/2004 | Booth | H01B 7/0876 | 174/117 F |
| 6,760,523 B2 * | 7/2004 | V. Nechitailo | G02B 6/441 | 385/112 |
| 6,937,802 B2 * | 8/2005 | Jamet | G02B 6/441 | 385/106 |
| 6,958,444 B1 * | 10/2005 | Chou | H01B 7/0892 | 174/113 R |
| 7,297,872 B2 * | 11/2007 | Morijiri | H01B 11/203 | 174/117 F |
| 7,465,879 B2 * | 12/2008 | Glew | H01B 7/0892 | 174/113 C |
| 8,494,656 B2 * | 7/2013 | Seifert | A61N 1/05 | 607/122 |
| 8,811,788 B2 * | 8/2014 | Sasaki | G02B 6/443 | 385/126 |
| 9,349,508 B2 * | 5/2016 | Nonen | H01B 11/20 | |
| 9,686,893 B2 * | 6/2017 | Gundel | H01B 7/0861 | |
| 9,865,377 B2 * | 1/2018 | Nakamura | H01B 11/04 | |
| 9,883,620 B2 * | 1/2018 | Gundel | H01B 7/0861 | |
| 10,134,506 B2 * | 11/2018 | Gundel | H01B 7/0838 | |
| 10,170,217 B2 * | 1/2019 | Gundel | H01B 7/0861 | |
| 10,185,105 B2 * | 1/2019 | Risch | G02B 6/4403 | |
| 2006/0157267 A1 * | 7/2006 | Morijiri | H01B 11/203 | 174/117 F |
| 2006/0237219 A1 * | 10/2006 | Glew | H01B 7/0892 | 174/113 C |
| 2011/0017491 A1 * | 1/2011 | Lu | H01B 7/0892 | 174/107 |
| 2011/0110635 A1 * | 5/2011 | Toge | G02B 6/4403 | 385/102 |
| 2011/0256756 A1 * | 10/2011 | Lu | H01B 7/0892 | 439/449 |
| 2011/0267798 A1 * | 11/2011 | Nakazaki | H01B 7/0892 | 361/827 |
| 2012/0325527 A1 * | 12/2012 | Lin | H05K 1/028 | 174/254 |
| 2013/0240243 A1 * | 9/2013 | Gundel | H01B 7/0838 | 174/117 F |
| 2015/0294766 A1 * | 10/2015 | Gundel | H01B 7/0861 | 174/34 |
| 2017/0076840 A1 * | 3/2017 | Nakamura | H01B 11/04 | |
| 2017/0200532 A1 * | 7/2017 | Gundel | H01B 7/0838 | |
| 2018/0303013 A1 * | 10/2018 | Li | H05K 9/0088 | |
| 2019/0021193 A1 * | 1/2019 | Gundel | H01B 7/0861 | |

* cited by examiner

ROUND CABLE

CROSS-REFERENCE TO RELATED APPLICATION

This non-provisional application claims priority under 35 U.S.C. § 119(a) to Patent Application No. 201710869269.7 filed in China on Sep. 23, 2017, the entire contents of which are hereby incorporated by reference.

BACKGROUND

Technical Field

The present disclosure relates to round cables.

Related Art

Currently, cables used in the industry are usually round. Such a cable includes a conducting wire, an insulator, an aluminum foil, a metal braid layer, an outer insulation jacket, and the like arranged sequentially from inside to outside. Before the cable is soldered on a connector or a circuit board, the conducting wires need to be manually and forcibly twisted and arranged (that is, wire arrangement). After being released, the conducting wires may deform due to elastic recovery. Overall arrangement cannot be implemented, and usually only one conducting wire can be arranged and then one soldering point is manually soldered. Automatic soldering of a soldering machine cannot be implemented, the workload is heavy, and the efficiency is not high.

SUMMARY

The present disclosure provides a round cable having a reduced outer diameter.

According to some embodiments, a round cable includes an internal cable formed by rolling a flat cable and an outer insulation jacket covering the outer side of the internal cable, where several conductors are provided in the internal cable, the internal cable includes several sector portions and a first connecting portion connecting every two adjacent sector portions, and the sector portions are stacked together one by one in a circumferential direction.

The internal cable of the round cable of the present disclosure includes several sector portions and a first connecting portion connecting every two adjacent sector portions, and the sector portions are stacked together one by one in a circumferential direction. Such a design helps reducing the outer diameter of a round cable. After the round cable is unfolded, the conductors may be sequentially arranged, a wire arrangement action can be omitted, processing of an automaton is facilitated, automatic soldering of a soldering machine is facilitated, and production efficiency is improved.

DETAILED DESCRIPTION

Referring to FIG. 1A to FIG. 4, an embodiment of a round cable 10 of the present disclosure is a USB Type-C transmission cable. The round cable 10 includes an internal cable 11 formed by rolling a flat cable and a round outer insulation jacket 12 covering the outer side of the internal cable 11.

Figure 1A:
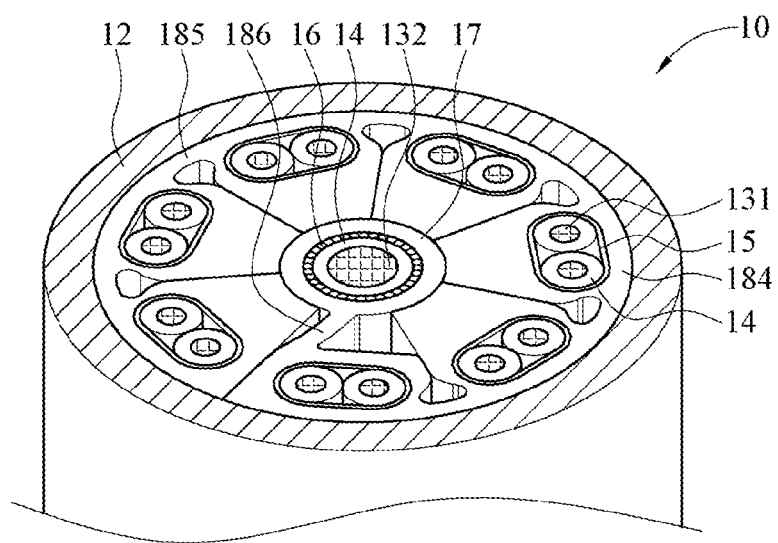
FIG. 1A is a three-dimensional schematic view of a round cable according to an embodiment.
Figure 1B:
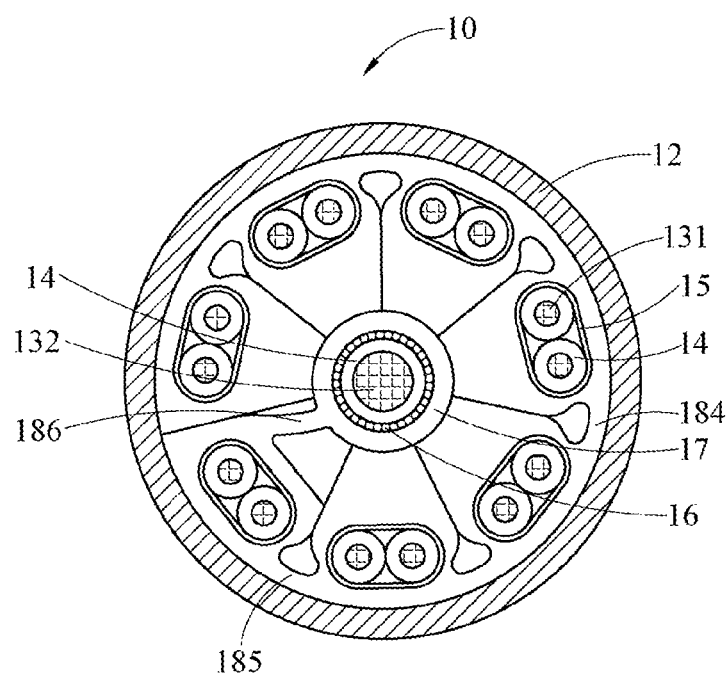
FIG. 1B is a schematic sectional view of the round cable in FIG. 1A.
Figure 2:
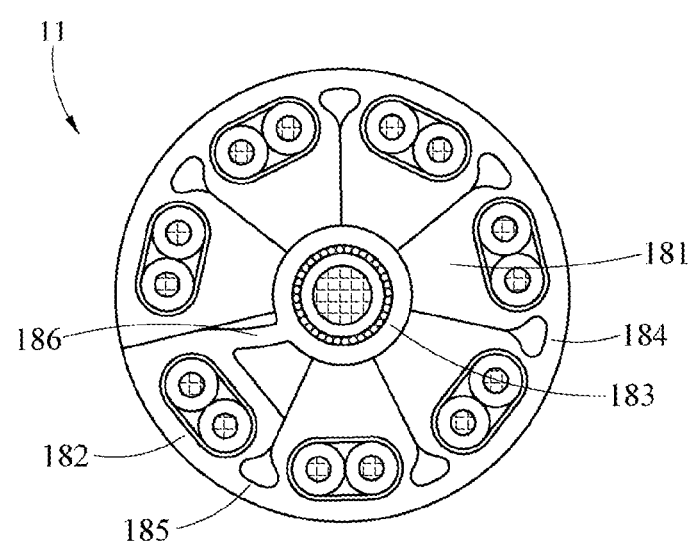
FIG. 2 is a schematic sectional view of an internal cable of the round cable in FIG. 1A, where an outer insulation jacket is not shown.

An outer side and an inner side recorded of the present disclosure are determined by radial directions of a circular cross section in FIG. 1A, FIG. 1B, and FIG. 2. A side inside one sector relative to a radial direction is the inner side, and a side outside the sector relative to a radial direction is the outer side.

According to an embodiment, the internal cable 11 includes several conductors, several insulators 14, several shielding layers 15, a metal winding layer 16, and an inner jacket 17. The conductors include several pairs of differential signal conductors 131 and a power conductor 132. The insulators 14 covers the outer sides of each differential signal conductor 131 and the power conductor 132. Each shielding layer 15 is an aluminum foil and covers the outer sides of two insulators 14 corresponding to each pair of differential signal conductors 131. The metal winding layer 16 covers the outer side of an insulator 14 corresponding to the power conductor 132 and provides grounding for the round cable 10. The inner jacket 17 covers the periphery of the outer sides of the shielding layer 15 and the metal winding layer 16. The inner jacket 17 is made of an electrically conductive plastic material. A braided layer may be omitted in the round cable 10. Certainly, the inner jacket 17 may be made of an insulating material.

The internal cable 11 includes several sector portions 181, a rectangular portion 182, a circular portion 183, a first connecting portion 184 connecting every two adjacent sector portions 181, a second connecting portion 185 connecting a sector portion 181 and the rectangular portion 182, and a third connecting portion 186 connecting the rectangular portion 182 and the circular portion 183.

Pairs of differential signal conductors 131 are arranged respectively in each sector portion 181 and the rectangular portion 182. The sizes of the sector portions 181 may be the same or different. The outer side surface of the rectangular portion 182 is an arc surface. The first connecting portions 184 and the second connecting portion 185 are connected on arc surfaces (as seen from the cross section, the arc surface is an arc side, or may also be referred to as a sector arc) of the sector portions 181 and the rectangular portion 182. The third connecting portion 186 is connected to an inner side edge of the rectangular portion 182. The circular portion 183 is located at one end of the internal cable 11. The rectangular portion 182 is located between the sector portion 181 and the circular portion 183.

During the fabrication of the round cable 10 of the present disclosure, first, the internal cable 11 is curled in circumferential direction. The sector portions 181 and the rectangular portion 182 are stacked together one by one with the circular portion 183 being a central axis. The rectangular portion 182 is located between two of the sector portions 181 in the circumferential direction. The differential signal conductors 131 are arranged in the periphery of the power conductor 132 in a circumferential direction. The first connecting portions 184 and the second connecting portion 185 are arranged on a circumference at an interval to form parts of the circumference, and are tightly attached to the outer insulation jacket 12. Eventually, the outer insulation jacket 12 covers the outer side of the inner jacket 17. A surface, facing the outer insulation jacket 12, on the outer side of each sector portion 182 is a convex arc surface. A surface, facing the power conductor 132, on the inner side of each sector portion 182 is a concave arc surface. The fabrication of the round cable 10 is completed. Such a design helps reducing the outer diameter of the round cable 10.

Figure 3A:
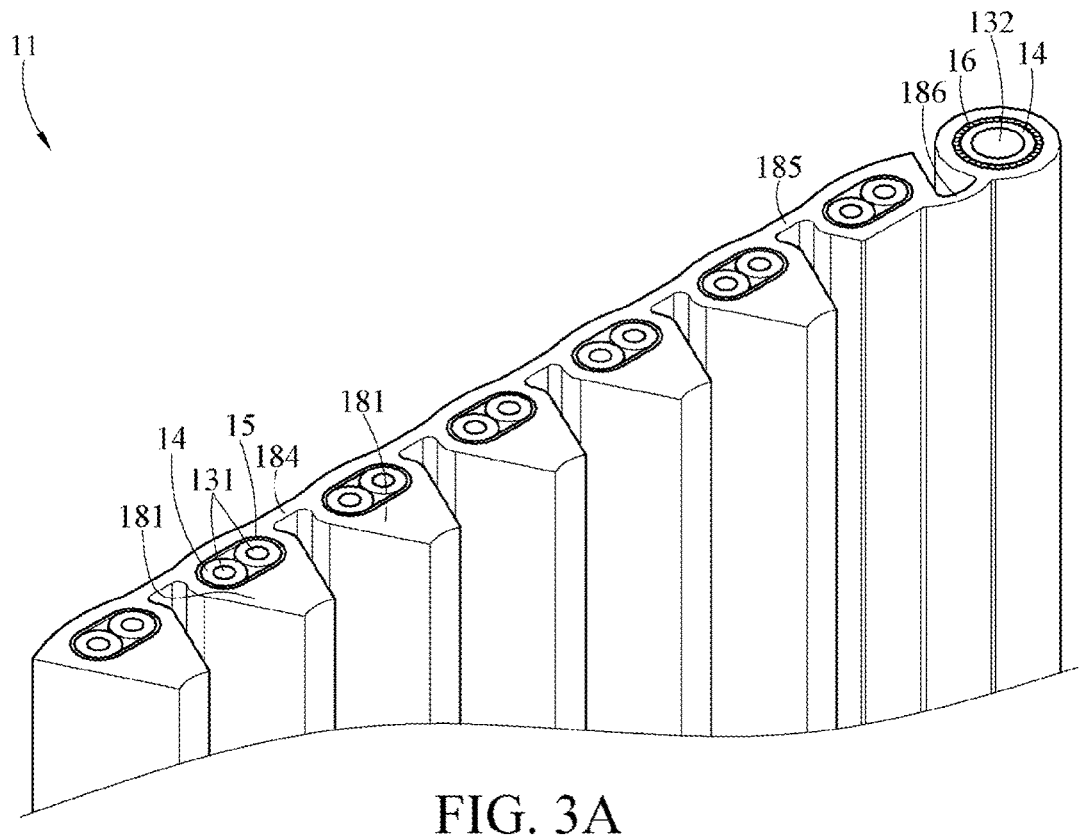
FIG. 3A is a three-dimensional schematic view after an internal cable of the round cable in FIG. 1A is unfolded.
Figure 3B:
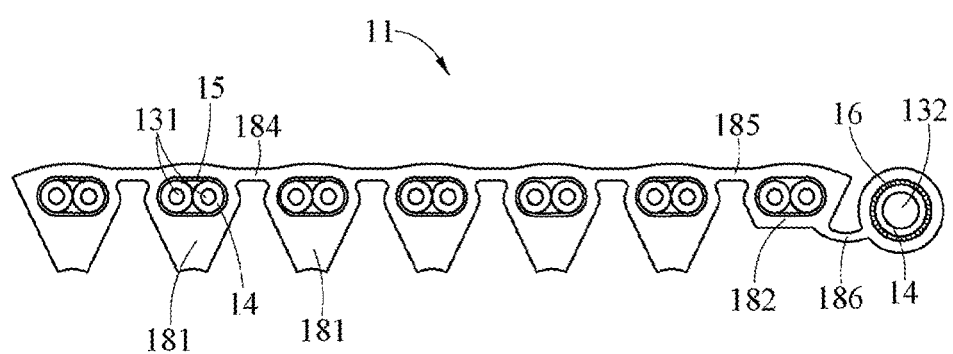
FIG. 3B is a schematic sectional view after the internal cable of the round cable in FIG. 3A is unfolded.
Figure 4:
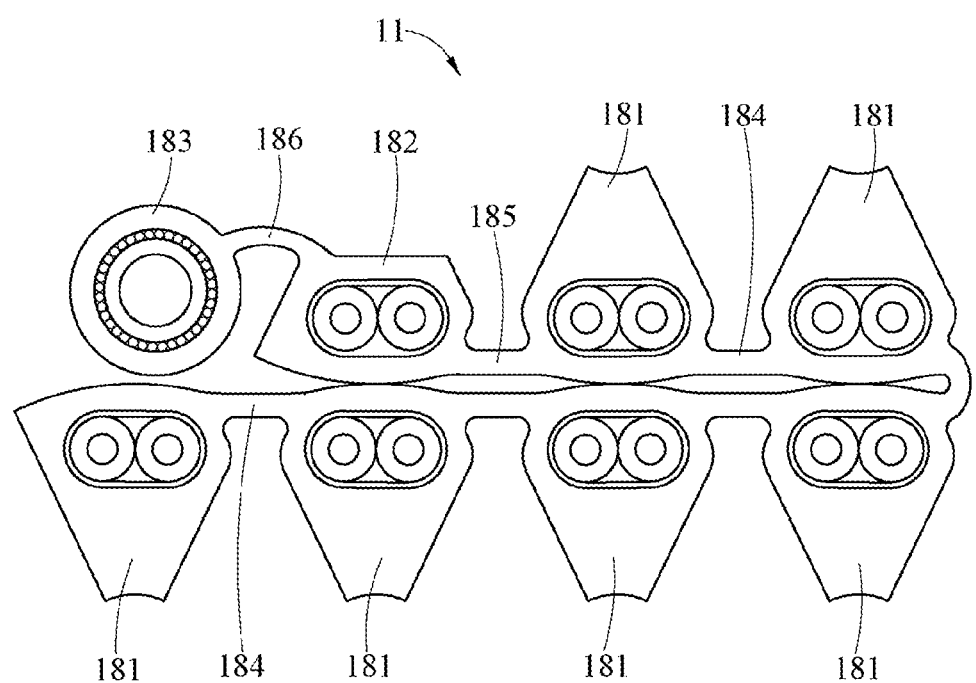
FIG. 4 is a schematic view after an internal cable of a round cable is unfolded and arranged in two rows according to an embodiment.

Referring to FIG. 3A and FIG. 3B, after the internal cable 11 of the present disclosure is unfolded, the conductors are arranged in a row (which is a flat cable). Wire arrangement may be omitted. Processing of an automaton is facilitated. Automatic soldering of a soldering machine is facilitated, and production efficiency is improved. Referring to FIG. 4, after the internal cable 11 of the present disclosure is unfolded, the conductors are arranged in two rows to facilitate automatic soldering to two-row soldering points of a connector or a circuit board, and production efficiency is improved.

As can be seen from the foregoing description, the sector portions 181, the rectangular portion 182, the first connecting portions 184, and the second connecting portion 185 are rolled to be round. Therefore, although the rectangular portion 182 is called "rectangular", two sides of the rectangular portion 182 (the sectional view in FIG. 3A and FIG. 3B is used as an example) are approximately two straight sides (that is, radius sides of a sector, referred to as sector sides hereinafter) of a typical sector. A sum of sector angles (referred to as sector angles θ for short hereinafter, referring to FIG. 6) of sectors of the sector portions 181 and the rectangular portion 182 may be substantially less than or equal to 360 degrees.

Figure 5:
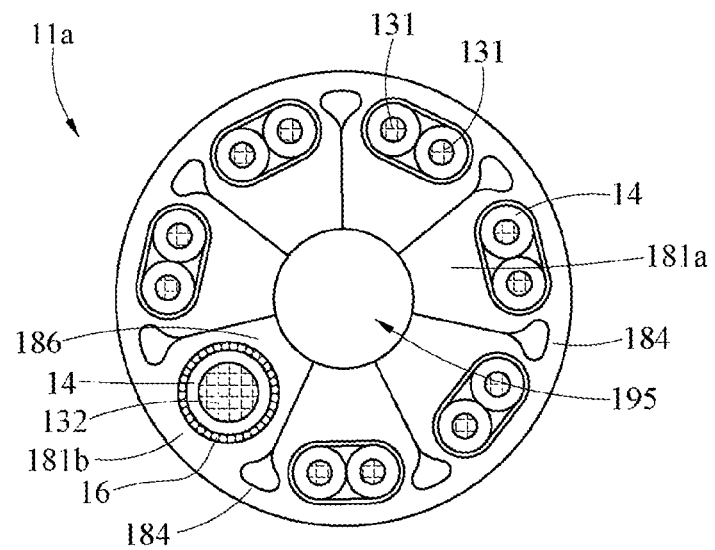
FIG. 5 is a schematic sectional view of an internal cable of a round cable of the present disclosure according to an embodiment.

Referring to FIG. 5, FIG. 5 is a schematic sectional view of an internal cable 11a in an embodiment of a round cable. As can be seen from FIG. 5, the internal cable 11a includes a plurality of sector portions 181a, 181b and a plurality of first connecting portions 184. Each first connecting portion 184 is used to connect adjacent sector portions 181a, 181b. In this embodiment, a quantity of the sector portions 181a, 181b is a quantity of the first connecting portions 184 plus 1. A sum of sector angles of the sector portions 181a, 181b is substantially less than or equal to 360 degrees. Compared with the embodiment in FIG. 2, the circular portion 183 in FIG. 1A and FIG. 1B is not provided in this embodiment. In this embodiment, after the sector portions 181a, 181b and the first connecting portions 184 are rolled to be round (the three-dimensional view shows the form of a round cable), the central part is a hollow-out portion 195. The hollow-out portion 195 is formed of truncated sides 191 (referring to FIG. 6; details are described below). The size of the hollow-out portion 195 may change depending on different cases. In an embodiment, the internal cable 11a may have no hollow-out portion 195.

In this embodiment, the sector portion 181a includes the conductors 131, and the sector portion 181b includes the conductor 132. Each first sector portion 181a includes two differential signal conductors 131, and a second sector portion 181b includes one power conductor 132 (which may also be referred to as a power conducting wire). In another embodiment, the internal cable 11a may only include seven first sector portions 181a but do not include the second sector portion 181b. That is, the internal cable 11a does not have the foregoing power conductor 132. Moreover, in an embodiment, the quantity of the sector portions 181 included in the internal cable 11a may change according to application requirements of cables. For example, the internal cable 11a includes six or eight first sector portions 181a, but the present disclosure is not limited thereto.

Figure 6:
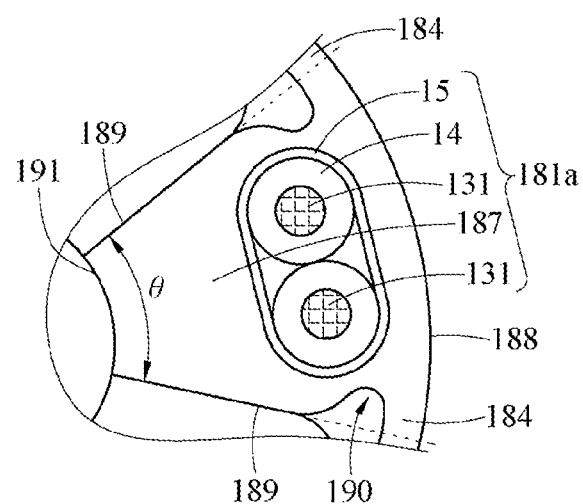
FIG. 6 is a schematic structural sectional view of a single sector portion in FIG. 5.

Referring to FIG. 6, FIG. 6 is a schematic structural sectional view of a single sector portion (the first sector portion 181a) in FIG. 5. The first sector portion 181a includes two differential signal conductors 131, two insulators 14 covering the two conductor 131, a shielding layer 15 covering each insulator 14, and an insulating portion 187 covering the shielding layer 15. As can be seen from FIG. 6, the insulating portion 187 has two sector sides 189 of the first sector portion 181a and a sector arc 188. An included angle between the two sector sides 189 is a sector angle θ of the foregoing sector portion 181a. During assembly, adjacent sector sides 189 of adjacent sector portions 181a are in contact with each other to form a section of a circle. Therefore, the sector arc 188 and the first connecting portions 184 form the circumference of the circle. No clear dividing line needs to be provided between the sector arc 188 and the first connecting portions 184.

The sector side 189 of each first sector portion 181a is provided with a concave portion 190 at a position near the first connecting portion 184. When the internal cable 11 is rolled, the concave portions 190 may enable sector sides 189 of adjacent sector portions 181a to be in contact. A truncated side 191 (that is, there is no sharp angle of a standard sector) is connected at the inner side (in a direction toward the center of the cross section in FIG. 5) of an insulating portion 187 of a sector portion 181a. The truncated side 191 may also enable sector sides 189 of adjacent sector portions 181a to be in contact when the internal cable 11 is rolled. The foregoing inner jacket 17 may include the foregoing plurality of insulating portions 187.

Referring to FIG. 5 and FIG. 6 again, the second sector portion 181b includes a power conductor 132, an insulator 14 covering the power conductor 132, and a metal winding layer 16 covering the insulator 14. The second sector portion 181b also has two sector sides 189, a sector arc 188, and a truncated side 191. A concave portion 190 is also provided between a sector side 189 of a second sector portion 181b and a truncated side 191 connected to the sector side 189.

Referring to FIG. 1A and FIG. 1B, in an embodiment, the internal cable 11 includes a plurality of sector portions 181, a rectangular portion 182, a plurality of first connecting portions 184, and a second connecting portion 185. A quantity of the first connecting portions 185 is a quantity of the sector portions 181 minus 1. Each first connecting portion 184 connects two adjacent sector portions 181. The rectangular portion 182 and each sector portion 181 respectively have two sector sides 189 and a sector angle θ. A sum of the sector angles is substantially less than or equal to 360 degrees. Adjacent sector sides 189 are in contact with each other. The rectangular portion 182 and each sector portion 181 respectively include a conductor. In the embodiment in FIG. 1A, FIG. 1B, and FIG. 2, the rectangular portion 182 and each sector portion 181 respectively include two differential signal conductors 131.

Referring to FIG. 1A and FIG. 1B, in an embodiment, the internal cable 11 further includes a circular portion 183 and a third connecting portion 186, the third connecting portion 186 connects the circular portion 183 and the rectangular portion 182. The circular portion 183 is located on the inner sides of the truncated sides 191. The circular portion 183 includes a power supply conducting wire 132.

Although preferred implementation manners of the present disclosure have been disclosed for illustration, a person of ordinary skill in the art is aware that various improvements, additions, and replacements are possible without departing from the scope and spirit of the content disclosed in the claims.

What is claimed is:

1. A round cable, comprising an internal cable formed by rolling a flat cable and an outer insulation jacket covering the outer side of the internal cable, wherein the internal cable is provided with a plurality of conductors, the internal cable comprises a plurality of sector portions and a first connecting portion connecting every two adjacent sector portions, each sector portion has two sector sides and a sector angle included between the two sector sides, the sector portions are stacked together one by one in a circumferential direction, and adjacent sector portions are in contact with each other.

2. The round cable according to claim 1, wherein the conductors are arranged on the sector portions.

3. The round cable according to claim 1, wherein a surface, facing the outer insulation jacket, on the outer side of each sector portion is a convex arc surface.

4. The round cable according to claim 1, wherein the first connecting portions are arranged on a same circumference at an interval.

5. The round cable according to claim 1, wherein the internal cable further comprises a rectangular portion, a circular portion, a second connecting portion connecting the rectangular portion and a sector portion, and a third connecting portion connecting the rectangular portion and the circular portion, the circular portion is located at the center of the round cable, the flat cable is rolled with the circular portion being a central axis into the internal cable, and the rectangular portion is located between two of the sector portions in the circumferential direction.

6. The round cable according to claim 5, wherein conductors disposed in the rectangular portion and the circular portion are disposed in the internal cable, pairs of differential signal conductors are disposed in each sector portion and the rectangular portion, and a power conductor is disposed in the circular portion.

7. The round cable according to claim 6, wherein the internal cable comprises an insulator covering each conductor, a shielding layer covering the outer side of an insulator corresponding to each differential signal conductor, a metal winding layer covering the outer side of an insulator corresponding to the power conductor and used for grounding, and an inner jacket covering the outer sides of the shielding layer and the metal winding layer, and the inner jacket is located in the outer insulation jacket.

8. The round cable according to claim 7, wherein the inner jacket is made of an electrically conductive plastic material.

9. The round cable according to claim 5, wherein a surface, facing the circular portion, on the inner side of each sector portion is a concave arc surface, and is tightly attached to the circular portion, and a surface, facing the outer insulation jacket, on the outer side of the rectangular portion is a convex arc surface, and is tightly attached to the outer insulation jacket.

10. The round cable according to claim 1, wherein the round cable is a USB Type-C transmission cable.

11. A cable, comprising:
an internal cable, comprising a plurality of sector portions and a plurality of first connecting portions, wherein a quantity of the first connecting portions is a quantity of the sector portions minus 1, each first connecting portion connects two adjacent sector portions, each sector portion has two sector sides and a sector angle, a sum of the sector angles is substantially less than or equal to 360 degrees, adjacent sector sides are in contact with each other, and each sector portion comprises a conductor; and
an outer jacket, covering the internal cable.

12. The cable according to claim 11, wherein a truncated side is connected between the inner sides of the two sector sides of each sector portion.

13. The cable according to claim 11, wherein a concave portion is provided respectively between the two sector sides of each sector portion and the first connecting portions connected to the two sector sides.

14. The cable according to claim 11, wherein each sector portion further comprises an insulator, a shielding layer, and an insulating portion, the insulator covers the conductor, the shielding layer covers the insulator, and the insulating portion covers the shielding layer.

15. The cable according to claim 14, wherein a truncated side is provided between the inner sides of the two sector sides of each sector portion, and a concave portion is provided respectively between the two sector sides of each sector portion and the first connecting portions connected to the two sector sides.

16. A cable, comprising:
an internal cable, comprising a plurality of sector portions, a rectangular portion, a plurality of first connecting portions, and a second connecting portion, wherein a quantity of the first connecting portions is a quantity of the sector portions minus 1, each first connecting portion connects two adjacent sector portions, the rectangular portion and each sector portion respectively have two sector sides and a sector angle, a sum of the sector angles is substantially less than or equal to 360 degrees, and adjacent sector sides are in contact with each other, and the rectangular portion and each sector portion respectively comprise a conductor; and
an outer jacket, covering the internal cable.

17. The cable according to claim 16, wherein a truncated side is provided between the inner sides of the two sector sides of each sector portion.

18. The cable according to claim 17, further comprising a circular portion and a third connecting portion, wherein the third connecting portion connects the circular portion and the rectangular portion, the circular portion is located on the inner side of the truncated side, and the circular portion comprises a power supply conducting wire.

* * * * *